(12) United States Patent
Dabelstein et al.

(10) Patent No.: US 6,576,877 B2
(45) Date of Patent: Jun. 10, 2003

(54) INDUCTION PROCESSING WITH THE AID OF A CONDUCTIVE SHIELD

(75) Inventors: Donald K. Dabelstein, Renton, WA (US); Matthew D. Carter, Portland, OR (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 09/952,824

(22) Filed: Sep. 14, 2001

(65) Prior Publication Data

US 2003/0052123 A1 Mar. 20, 2003

(51) Int. Cl.[7] ................................................ H05B 6/14
(52) U.S. Cl. ........................ 219/640; 219/670; 148/567; 266/129
(58) Field of Search ................................ 219/640, 635, 219/645, 646, 639, 670; 266/129; 148/573, 572, 567, 569

(56) References Cited

U.S. PATENT DOCUMENTS

| | | | |
|---|---|---|---|
| 3,927,870 A | 12/1975 | Seulen et al. | |
| 4,026,732 A | 5/1977 | Dammel et al. | |
| 4,123,642 A | 10/1978 | Dammel et al. | |
| 4,251,705 A | * 2/1981 | Balzer | 219/640 |
| 4,355,222 A | * 10/1982 | Geithman et al. | 219/633 |
| 4,438,310 A | * 3/1984 | Cachat | 219/641 |
| 4,604,510 A | * 8/1986 | Laughlin et al. | 219/639 |
| 4,678,883 A | * 7/1987 | Saitoh et al. | 219/645 |
| 4,808,779 A | 2/1989 | Cogley | |
| 4,962,291 A | * 10/1990 | Fujita et al. | 219/602 |
| 6,059,898 A | 5/2000 | Fisher et al. | |

* cited by examiner

*Primary Examiner*—Philip H. Leung
(74) *Attorney, Agent, or Firm*—Harness Dickey & Pierce P.L.C.

(57) ABSTRACT

A method for induction heating a workpiece made of a material such as ferrous material or alloy is carried out by placing a non-magnetic conductive shield in proximity to a current concentrating surface of the workpiece and exposing the workpiece with a shield in place to a time varying magnetic field. The magnetic field induces eddy currents in the surface of the workpiece. The conductive shield is placed in sufficient proximity to reduce or eliminate the eddy currents in the portion covered by the shield. At least a part of the uncovered portion of the workpiece is heated above the austenitizing or solution temperature of the material. At the same time, the covered portions of the workpiece are protected from overheating by the shield. The workpiece is then quenched to complete the hardening process.

21 Claims, 8 Drawing Sheets

Section view of gear tooth root without invention

Pattern better follows tooth profile

Section view of gear tooth root with invention

INDUCTION PROCESSING WITH THE AID OF A CONDUCTIVE SHIELD

FIELD OF THE INVENTION

The present invention relates to induction processing with the aid of a conductive shield. More particularly, it relates to the use of a conductive shield to prevent overheating of parts of a workpiece during magnetic induction heating.

BACKGROUND OF THE INVENTION

The physical properties of metal workpieces, such as those made from iron and iron alloys, can be improved by the process of heat treatment. During heat treatment, a workpiece is heated above its solution temperature and then quenched to reduce the temperature. Heat treatment hardens the surface of the workpiece, leading to improved surface durability and performance.

In iron alloys the solution temperature of interest is the well known austenitizing temperature at which the austenite phase transition occurs. It is important that the workpiece not be further heated so much as to exceed its fusion temperature or its melt temperature. If a workpiece is heated above the austenitizing or solution temperature as high as its fusion or melt temperature, generally the material performance will be adversely affected, as the portion of the workpiece heated to the fusion temperature or the melt temperature will be degraded or weakened.

The heat-hardened portion of a workpiece is more brittle than the untreated portion. For this reason it is often desirable to apply heat treatment so as to harden only the surface, or only a portion of the surface, of a workpiece. The part of the workpiece that is not heat treated will remain ductile while the heat treated area will become hardened. For example, a surface may be hardened while leaving the center of a workpiece relatively more ductile.

One method of heat treating involves heating the workpiece in an oven. However, the heat treatment in an oven is relatively slow and expensive, and tends to heat the workpiece through, rather than to heat only the surface. Surface heat treatment can be conveniently accomplished by induction heating. In induction heating, the workpiece is exposed to a time varying magnetic field. The magnetic field induces currents in the surface of the workpiece which causes the surface to increase in temperature. However, a drawback of induction heating is that it is subject to edge effects where areas of the workpiece which are induced current concentrators heat up faster in a magnetic field than other areas. Such uneven heating can result in overheating of certain parts of the workpiece during induction heating. Should such overheating result in the raising of a portion of the workpiece to above the fusion temperature or the melt temperature, it can lead to a weaker part with significantly shortened life.

Workpieces such as gears are often used in very corrosion prone environments, yet are expected to obtain a long service life such as up to thirty years or more. An example of such application is found in gear boxes used in the control systems of commercial aircraft. Such gears can be cadmium plated, placed in very expensive sealed units, and kept oiled in order to obtain the expected life. It would be desirable to use corrosion resistant steel or stainless steel in such applications so as to achieve the long life without the added expense of the cadmium plating. However, the traditional carburizing process used for hardening the gears destroys the corrosion resistance of stainless steel. Furthermore an alternative induction hardening process has a tendency to overheat the root area of the gear because of the relationship between the Curie temperature, the austenitizing or solution temperature, and the fusion or melt temperature.

All ferrous materials are characterized by a Curie temperature. Below the Curie temperature, the magnetic permeability of the material is greater than 1, while at the Curie temperature and above, the material loses its magnetic properties and the magnetic permeability becomes equal to 1. When the magnetic permeability is greater than 1, the workpiece has a large interaction with a magnetic field, so that induction heating is very rapid in a part of the workpiece that is below the Curie temperature. As the workpiece is heated during the induction heating process, parts of the workpiece approach the Curie temperature. At the Curie temperature, the magnetic permeability goes to 1 so that part of the workpiece heats up at a slower rate. Meanwhile other parts of the workpiece that have not yet reached the Curie temperature are being heated at an increased rate by the magnetic field. When those parts of the workpiece reach the Curie temperature, they will also start to then heat up at a slower rate. The result is that during induction heating, a workpiece is heated relatively quickly up to the Curie temperature. Above the Curie temperature, the induction heating process heats the workpiece up at a slower rate. However, because of the induced current concentrating effects of some of the surfaces of the workpiece, the heating is not uniform. Some parts of the workpiece are heated at a higher rate than other parts when the workpiece is above the Curie temperature.

During heat treatment it is desirable to heat the surface of interest, such as the teeth of a gear, to above the austenitizing or solution temperature of the material so as to provide a hardened surface for prolonged tool life. At the same time, it is desirable not to heat any of the other parts of the workpiece above its fusion temperature or its melt temperature. As discussed above, such would result in weaker parts with shortened life. However, because certain surfaces of the workpiece tend to concentrate the induced current, those surfaces are heated at a higher rate. It is therefore possible that by the time a gear tooth reaches the temperature required for heat hardening, other parts of the workpiece such as the roots of the gear will have been heated above the fusion temperature. This is particularly the case in corrosion resistant steel or stainless steel where the fusion temperature is not much higher than the austenitizing temperature. For example, one of the alloys has a Curie temperature of 1376° F. but has to be heated to the austenitizing temperature of 1965° F. for heat treatment. The fusion temperature is only 2200° F. Thus there is a relatively small temperature window between the austenitizing temperature and the fusion temperature. The problem is less severe with conventional gear steels. For example, one such alloy has a Curie temperature of 1444° F. and an austenitizing temperature of 1700° F. Furthermore, there is no fusion temperature and the melting temperature is 2700° F. It can be seen that in the conventional gear steel there is a temperature window of about 1000° between the austenitizing temperature and the melting temperature. Therefore in conventional gear steels the problem of overheating the roots of a gear during an induction hardening process are not as severe as when corrosion resistant steels or stainless steel are used.

It would be desirable to provide a method for induction heating of gears and other workpieces made of materials such as corrosion resistant steel or stainless steel. Desirably, such a method would avoid the drawback of overheating of surfaces of the workpiece that concentrate the induced current during induction heating. By such a method, the parts of the workpiece to be heat hardened should be heat treated to a temperature above the austenitizing temperature, while other parts of the workpiece do not exceed the fusion temperature or the melting temperature during the process.

SUMMARY OF THE INVENTION

A method is provided for induction heating a workpiece made of a metal or metal alloy, especially iron or an iron alloy. The workpiece has at least one induced current concentrating surface such as a hole through a shaft, an edge, or a gear root. The method is carried out by placing a non-magnetic conductive shield in proximity to a current concentrating surface of the workpiece. The workpiece with the shield in place is then exposed to a time varying magnetic field. The magnetic field has a frequency sufficient to cause eddy currents in the surface of the workpiece, and the conductive shield is placed in sufficient proximity to reduce or eliminate the eddy currents in the portion of the workpiece covered by the shield. Exposure to the magnetic field is carried out until at least a part of the unshielded portion of the workpiece is heated above the austenitizing or solution temperature of the material. At the same time, the shielded portion is protected from overheating by the shield so that it obtains a temperature below the fusion temperature or the melt temperature of the material. The workpiece is then quenched to complete the hardening process.

BRIEF DESCRIPTION OF THE DRAWINGS

FIG. 7a) shows a comparative example, while the gear tooth in FIG. 7b) was hardened with a method of the invention.

FIG. 8a) gives a comparative example, while FIG. 8b) shows a gear tooth root region hardened according to the invention.

DETAILED DESCRIPTION OF THE PREFERRED EMBODIMENTS

Figure 1:
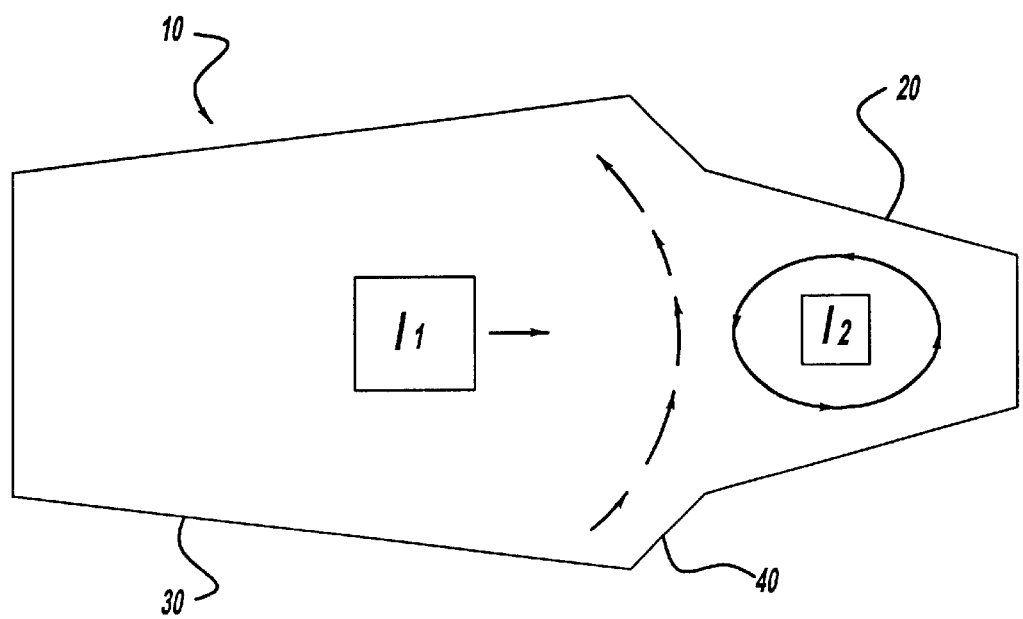
FIG. 1 shows induced eddy currents in a gear tooth.

A workpiece made of a variety of materials may be hardened by the process of the invention. Such materials are characterized by a solution temperature to which they must be heated in order to heat harden them. Preferred materials for carrying out the invention include iron and iron alloys. Such workpiece materials are characterized by an austenitizing temperature at which the austenite phase transition occurs during heat treatment, and by a fusion temperature or melt temperature. At the fusion temperature, ferrites are formed in the material, while at the melting temperature, the workpiece changes from solid to liquid. The fusion and melt temperatures are higher than the austenitizing temperature. In general it is desirable to heat at least part of the workpiece above the austenitizing temperature while avoiding heating any part of the workpiece above the fusion temperature or melt temperature. In a preferred material for carrying out the process of the invention, the fusion temperature is less than about 400° F. higher than the austenitizing temperature. Such materials are especially challenging to heat treat by prior induction heating processes.

The workpiece is further characterized by having one or more induced current concentrating surfaces. Such surfaces are generally any geometric feature such as a sharp corner, a valley, an opening, a slot, or other feature where the current is constricted by the geometry of the workpiece. In a preferred embodiment, the workpiece is a gear made of corrosion resistant steel or stainless steel. The induced current concentrating surface of the gear is the outside edge of the root area of the gear. The outside edge of the root area tends to become overheated in the induction heating processes of the prior art.

The workpiece is exposed to a time varying magnetic field. The magnetic field varies at a frequency to induce eddy currents in the surface of the workpiece sufficient to cause heating. Generally the eddy currents are induced in a layer of the surface characterized as a skin depth. The skin depth is characteristic of a material, and is also a function of the frequency of the magnetic field. Although the frequency is not particularly critical, it is preferred to use a magnetic field with a frequency greater than about 1000 Hz, and more preferably greater than about 3000 Hz. In preferred embodiments, frequencies up to 100 kHz and higher are used. Higher frequencies may be used, depending on the design of the coil or other magnetic field generator. For example, frequencies of 450 kHz and higher are useful in the invention.

To protect the induced current concentrating surfaces of the workpiece from overheating during induction heating, a non-magnetic conducting shield is placed in proximity to the induced current concentrating surface or surfaces. The shield is preferably made of a material that is more conductive than steel. In preferred embodiments, copper, aluminum, or their alloys can be used as the shield material.

The shield is placed in proximity to the induced current concentrating surfaces of the workpiece in order to reduce the eddy currents induced in the workpiece by the time varying magnetic field. Generally, the non-magnetic conducting shield should be placed close to the workpiece. The conducting shield may be placed in contact with the induced current concentrating surface.

The workpiece is exposed to the magnetic field for a time and a power sufficient to raise the temperature of the surface to be hardened to above its austenitizing or solution temperature. Thereafter the workpiece is quenched to complete the heat hardening process. Quenching can be carried by a number of methods depending on the heat hardenability of the material or alloy of the workpiece. Highly hardenable materials may be air-quenched. Alternatively, the workpieces may be quenched by immersion in or spraying with a coolant or quenchants. Suitable quenchants include any fluid capable of removing heat from the workpiece at a sufficient rate when brought into contact with the workpiece. For example, gases such as air and liquids such as water may be used as a quenchant. Other suitable quenchants include, without limitation, glycols and other organic compounds.

The material of the workpiece needs to be conductive so that the time varying magnetic field can induce eddy currents in the surface. In one embodiment, the material is an iron alloy. Examples include, without limitation, corrosion resistant iron alloy such as stainless steel or corrosion resistant steel. On heating, such alloys undergo a phase transition at a characteristic temperature called the austenitizing temperature. At a higher temperature, the material can either fuse at a fusion temperature, whereby ferrite material is formed in the material, or melt at a melting temperature, whereby the solid workpiece turns to liquid. It is generally desirable during heat treating to raise the surface temperature above the austenitizing temperature, but avoid exceeding the fusion temperature or melting temperature of the material.

Useful workpieces contain one or more current concentrating surfaces. These are geometric features or discontinuities such as cuts, valleys, steps, roots of gear teeth, holes through shafts or bearings, and the like. It is observed that during the heat treating process, the current concentrating surfaces tend to be heated faster than other surfaces. This can lead to overheating of the induced current concentrating surfaces during the heat treating process, especially, for example, in an iron alloy where the austenitizing termperature is much higher than the Curie temperature and relatively close to the fusion temperature or the melt temperature. For example, in corrosion resistant steel or stainless steel where the austenitizing temperature is more than 500° F. higher than the Curie temperature and less than 300° F. below the fusion temperature, the observed overheating is especially a problem.

The workpiece is exposed to a time varying magnetic field. Generally, the magnetic field is generated by an alternating current source such as a magnetic coil. It is possible however, to produce similar results but at lower current densities with a high flux permanent magnet moved at high speed across the workpiece. The power of the magnetic field is chosen according to the properties of the material of the workpiece and the time desired for carrying out the process. Generally, use of a higher power magnetic field will result in a faster process with concomitant lower turnaround times.

In one preferred embodiment, the workpiece comprises a gear, and the magnetic field is applied by placing the gear inside a magnetic coil. The geometry of the gear leads to current concentrations in the root area of the gear as illustrated in FIG. 1. In FIG. 1, a pie-shaped section 10 of a gear is shown having a gear tooth 20, a body 30, and a root region 40. On exposure to the magnetic field, a current $I_1$ is induced in the gear body while a current $I_2$ is induced in the tooth. The net effect is a current concentration in the root region 40 so that on induction hardening the root region 40 tends to heat at a rate higher than that of the tooth. As mentioned above, such unequal heating is especially a problem where the fusion temperature of the material is not very much higher than the solution or austenitizing temperature. In such cases, there is a danger that the root region 40 will reach a temperature above the fusion or melt temperature by the time the gear tooth 20 reaches the heat hardening solution or austenitizing temperature. In such a case, the roots of the gear would be weakened, leading to early failure and shorter life.

To reduce overheating in the current concentrating surfaces, a non-magnetic conductive shield is placed in proximity of the concentrating surface. The shield should be made of a conductive non-magnetic metal. Examples of materials include, without limitation copper, aluminum, gold, silver, and alloys of these. The thickness of the non-magnetic shield is not critical, but should be generally be a minimum of about 10 skin depths. The conductive shield should be placed in proximity to the current enhancing surface. The distance from the surface is not particularly critical, but it should be generally closer than a skin depth, as that term is defined as the depth to which eddy currents are induced in the workpiece by the magnetic field. In one embodiment, the shield is placed closer than 0.015 inches to the workpiece.

In a preferred embodiment, the conductive shield is placed in physical contact with the workpiece. Such physical contact can be achieved by using adhesives, by plating, or by using a variety of mechanical locators. In a preferred embodiment, the conductive shield is held in place on the workpiece by a disk locator as illustrated in the Figures.

The conductive shield can be placed close to the workpiece without being significantly heated compared to the gear. A way to visualize this phenomenon is with a simple transformer model. The induction coil can be viewed as the primary of a transformer and the workpiece as the secondary. Maximum power transfer to the workpiece occurs when the secondary impedance as seen from the primary terminals is the complex conjugate of the source impedance. If the source impedance is purely resistive, then the maximum power transfer occurs when the secondary resistance as seen from the primary is equal to the source resistance. In the case of a highly conductive shield such as a copper disk, the secondary appears as a low resistance relative to the source. In such a case, little power is delivered to the shield despite the fact that it is placed inside an induction coil. The workpiece, being made of steel is much more resistive and therefore is better matched to the power supply. For example, in the case of steel alloy XD15NW, the resistivity is more than 30 times higher than that of copper.

At the same time, the conductive shield does shield portions of the workpiece from the magnetic field, keeping eddy currents from being induced in the areas covered by the shield. In this way, the conductive shield alters the power deposition pattern in the workpiece without affecting the unshielded areas. In the case of gear hardening, the conductive shield eliminates the current circulating in the edge of the root of the gear.

The power reflected from the conductive shield may make the total workpiece impedance appear significantly lower. This may change the match with power supply, reducing the overall efficiency, and requiring higher levels to be set for the power supply to reach the same temperatures as when the shield is not present. Tuning of the matching network may be required to improve efficiency.

In one embodiment, the invention provides a method for heat treating a gear by placing a non-magnetic conductive shield in proximity to the root region of the gear and exposing the gear with the shield in place to a source of time varying magnetic flux, wherein the magnetic flux varies with a frequency sufficient to induce eddy currents in a skin depth of the surface of the gear and where the shield is in sufficiently close proximity to reduce and/or eliminate the eddy currents in the root region of the gear. In this embodiment, the shield consists of a thin conductive piece of material in an appropriate shape which is to be placed between the source of the magnetic field and the workpiece. In a preferred embodiment, the workpiece is made of iron or a ferrous alloy. The shield is typically of a highly conductive metal, such as copper or aluminum which has a greater conductivity than the alloy of the workpiece. The shield may be placed close to the material being heated, and even in contact either through adjacent placement or plating. The shield may be held in place by screws, chucks, adhesives or other mechanical means. The shape and size of the shield is chosen to approximately match the shape and size of the area to be protected from overheating during the induction heating process. For best results, the shield may be the same size as, or slightly larger than or smaller than the area to be protected, depending on various factors such as coil and workpiece geometry and the disposition of the workpiece in the coil. In practice, an optimum size and shape of the shield may be determined for a given set of conditions by empirical observation. One set of optimum conditions is illustrated in the Example below.

In an example of gear hardening, a conductive shield in the form of, for example, a disk is placed on the top and bottom faces of the gear. It is preferred that the outer diameter of the disk be approximately equal to the root diameter of the gear. Depending on the geometry of the coil and the coupling of the coil to the gear or other workpiece, the preferred diameter of the disk may be more or less than the the root diameter. In a non-limiting example, it is possible to use a disk that extends about 0.05 inches past the root of a six pitch gear. Naturally, the disk should not extend so far past the root of the gear so as to cover the teeth. As a non-limiting example, the disk may be roughly 0.04 inches thick.

The disk works by shielding the surface of the gears from induction of undesirable currents. Regions that require induced currents for resistive heating on the other hand, are left exposed to the magnetic field. In FIG. 1, two current components are shown in the gear. The total current can be viewed as the sum of the two circulating currents $I_1$ and $I_2$. One circulating current $I_2$ is making a small loop in an individual tooth, while the other circulating current $I_1$ on the surface of the gear travels around the whole gear. The current $I_1$ is constricted at the root, causing a local high current density at the edge of the root resulting in a localized hot spot. The conductive shield is used to eliminate the circulating current $I_1$. Instead of a disk, it is possible to use a conductive shield in the form of an annulus or ring. In such a case, the shield covers not the entire face of the gear, but only the region near the root. This is possible because most of the induced current flows on the surfaces closest to the coil. For this reason, it is generally not necessary to shield portions of the face of the gear farther away from the coil than the root region.

Figure 2A:
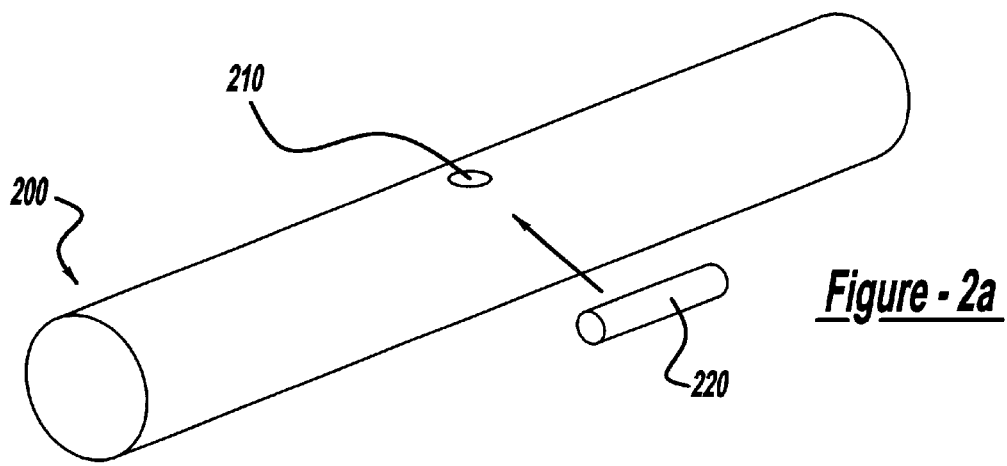
FIGS. 2a, 2b and 2c illustrate the invention applied to a shaft.
Figure 2B:
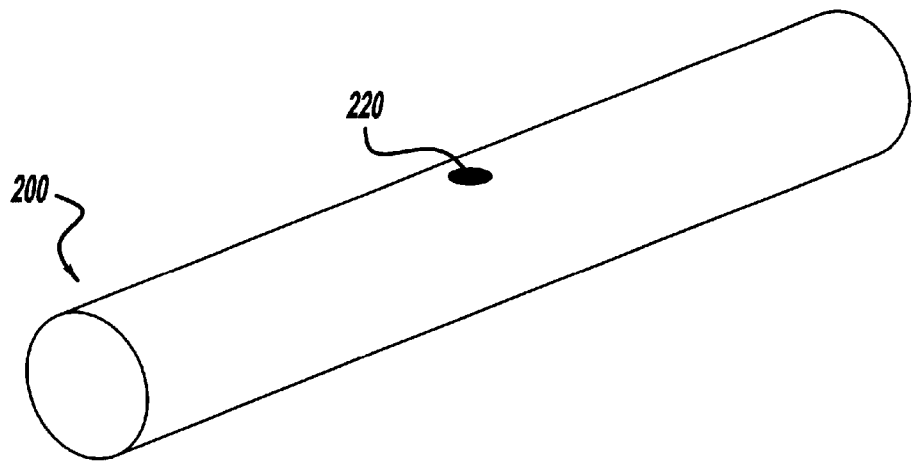
Figure 2C:
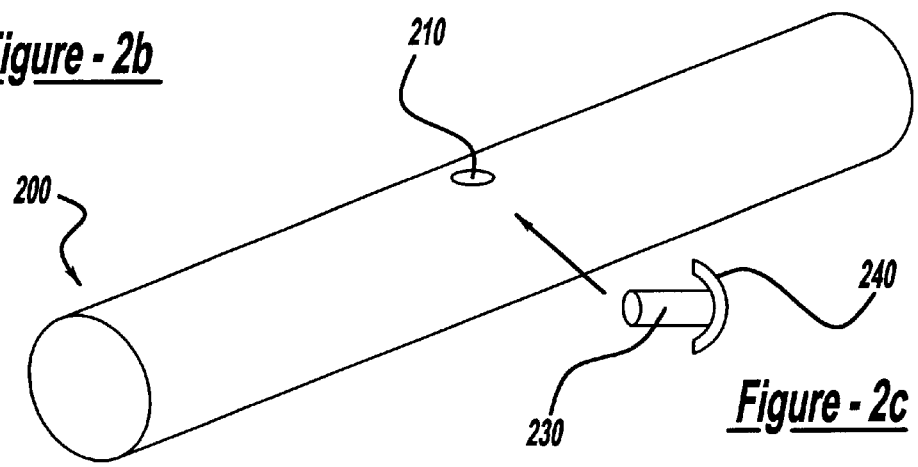

Other workpieces beside gears may be hardened by the process of the invention. For example in FIG. 2 there is shown a shaft 200 having a hole 210. In conventional induction heating, the hole 210 and the edge of the hole 210 would act as a current concentrating surface, which could lead to overheating during induction heating. To prevent this overheating, a conductive shield 220 in the shape of a simple pin, as shown in FIG. 2a, may be inserted into the hole 210. FIG. 2b shows the shaft 200 with the pin 220 in place. FIG. 2c shows an alternative embodiment where the conductive field is in the shape of a pin 230 having a cap 240. The shield with cap is to be inserted into the hole 210. Generally, the configuration of the conductive shield depends upon the desired results, the size of the shaft, the size of the hole, the frequency of the magnetic field, the geometry of the coil, and the like.

Figure 3A:
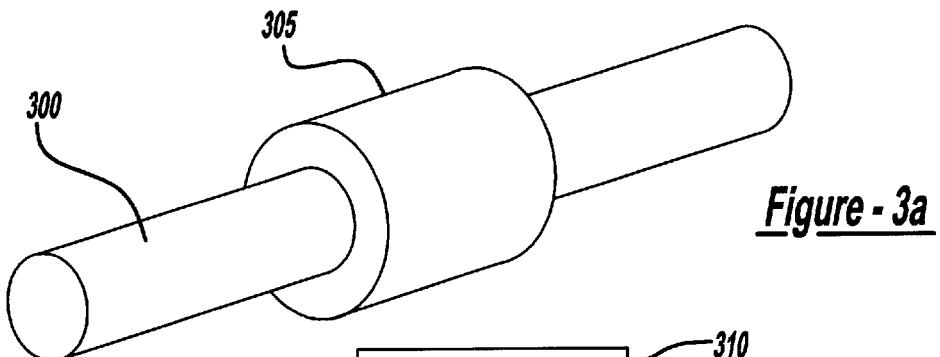
FIGS. 3a, 3b, 3c and 3d illustrate another embodiment of the heat treating method of the invention.
Figure 3B:
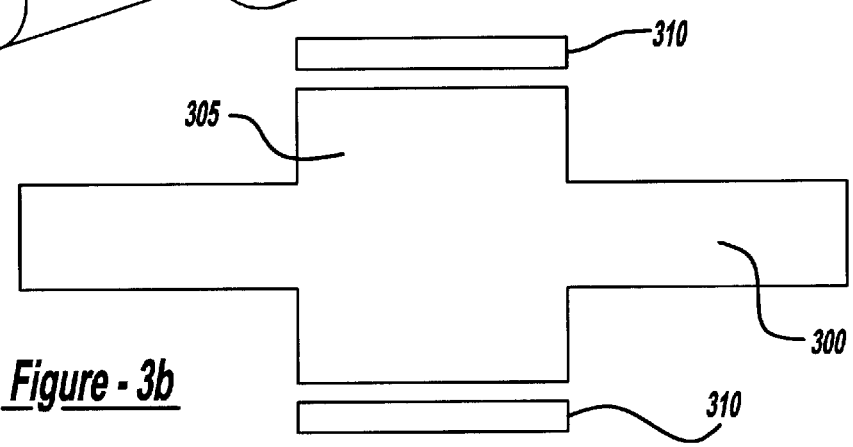
Figure 3C:
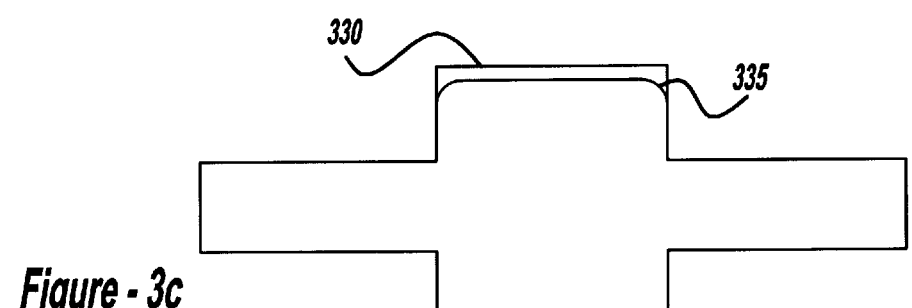
Figure 3D:
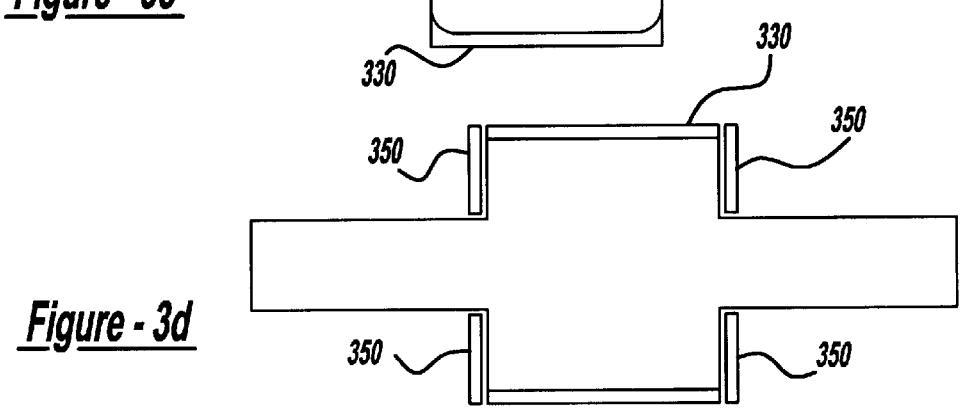

The process of the invention may also be used to heat treat journal shafts as illustrated in FIGS. 3a–3d. FIG. 3a shows a perspective view of a journal shaft 300. FIG. 3b shows a cross-sectional view of the shaft 300 with a magnetic coil 310 in place around the body 305 of the shaft. FIG. 3c shows in diagrammatic form the heating pattern of such a shaft induction heated without the presence of a conductive shield of the invention. There is a heat treated area 330 showing overheating at an edge 335. FIG. 3d shows the shaft with a shield 350 in place during induction heating. The heated area 330 shows uniform heating, with no overheating at the edges. The shield 350 may be in contact with the body of the shaft or it can be held a small distance away as discussed above.

Figure 4A:
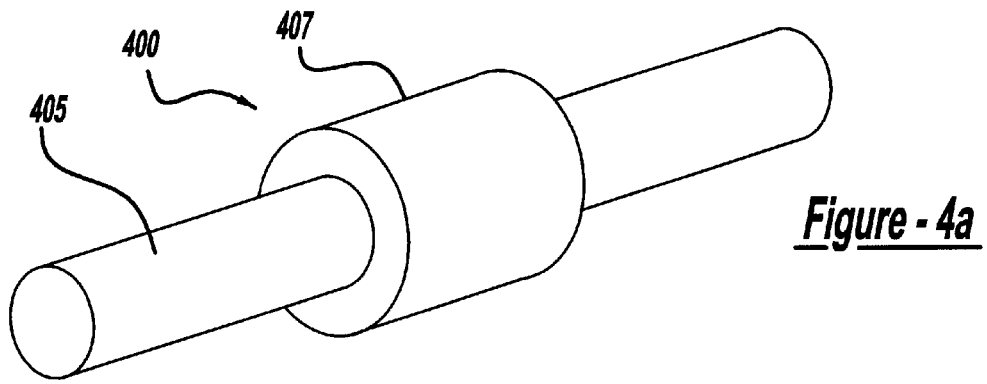
FIGS. 4a, 4b, 4c and 4d illustrate still another embodiment of the invention.
Figure 4B:
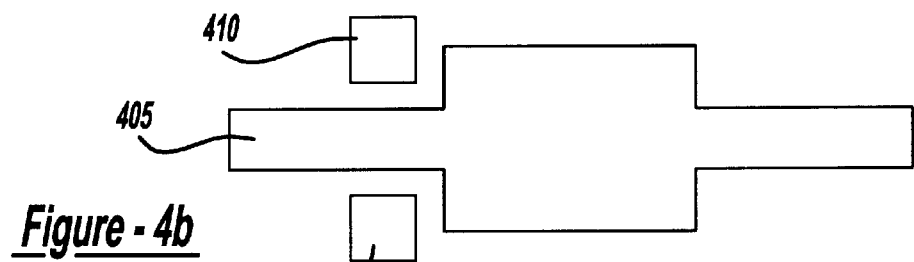
Figure 4C:
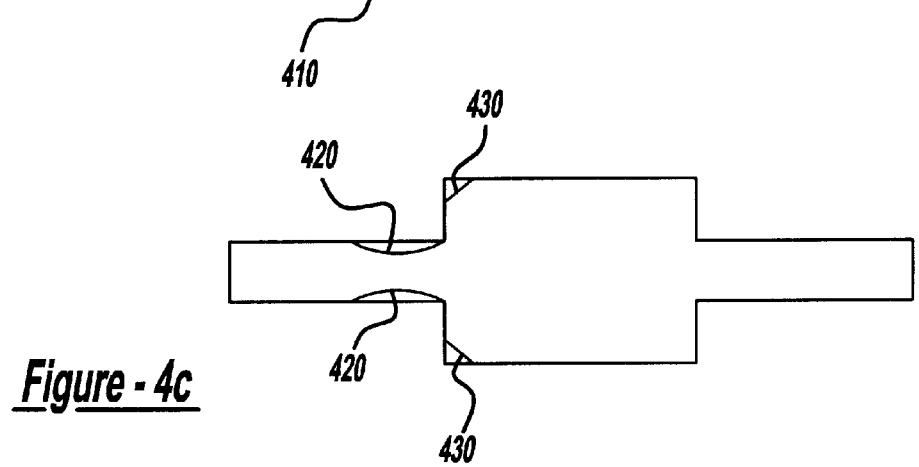
Figure 4D:
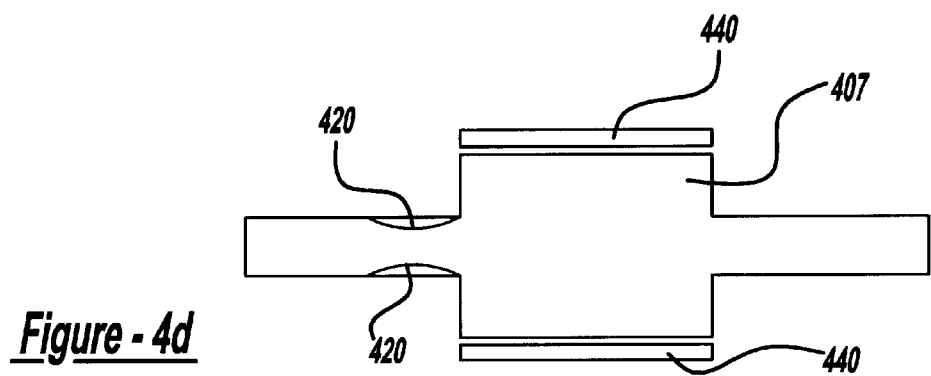

In FIGS. 3a–3d a journal bearing was induction heated by placing the coil around the body of the shaft and shielding the faces of the shaft body during the process. FIGS. 4a–4d show an alternative embodiment where the journal bearing 400 is heated by placing a coil 410 around the shaft portion 405 of the journal bearing. FIG. 4a shows a perspective view of the journal bearing 400 consisting of a body section 407 and a shaft 405. FIG. 4b shows a cross-sectional view of the journal bearing with a magnetic coil 410 in place around the shaft portion 405. FIG. 4c shows the heating pattern resulting from induction heating with the coil 410 in place. A hardened area 420 is shown along with undesired overheating at an edge region 430. FIG. 4d shows the heating pattern resulting from induction heating of the journal bearing as shown in FIG. 4b but with a conductive shield 440 in place around the body 407. Desirable hardening is seen in area 420, without undesired overheating at the edge as shown in FIG. 4c.

Figure 5:
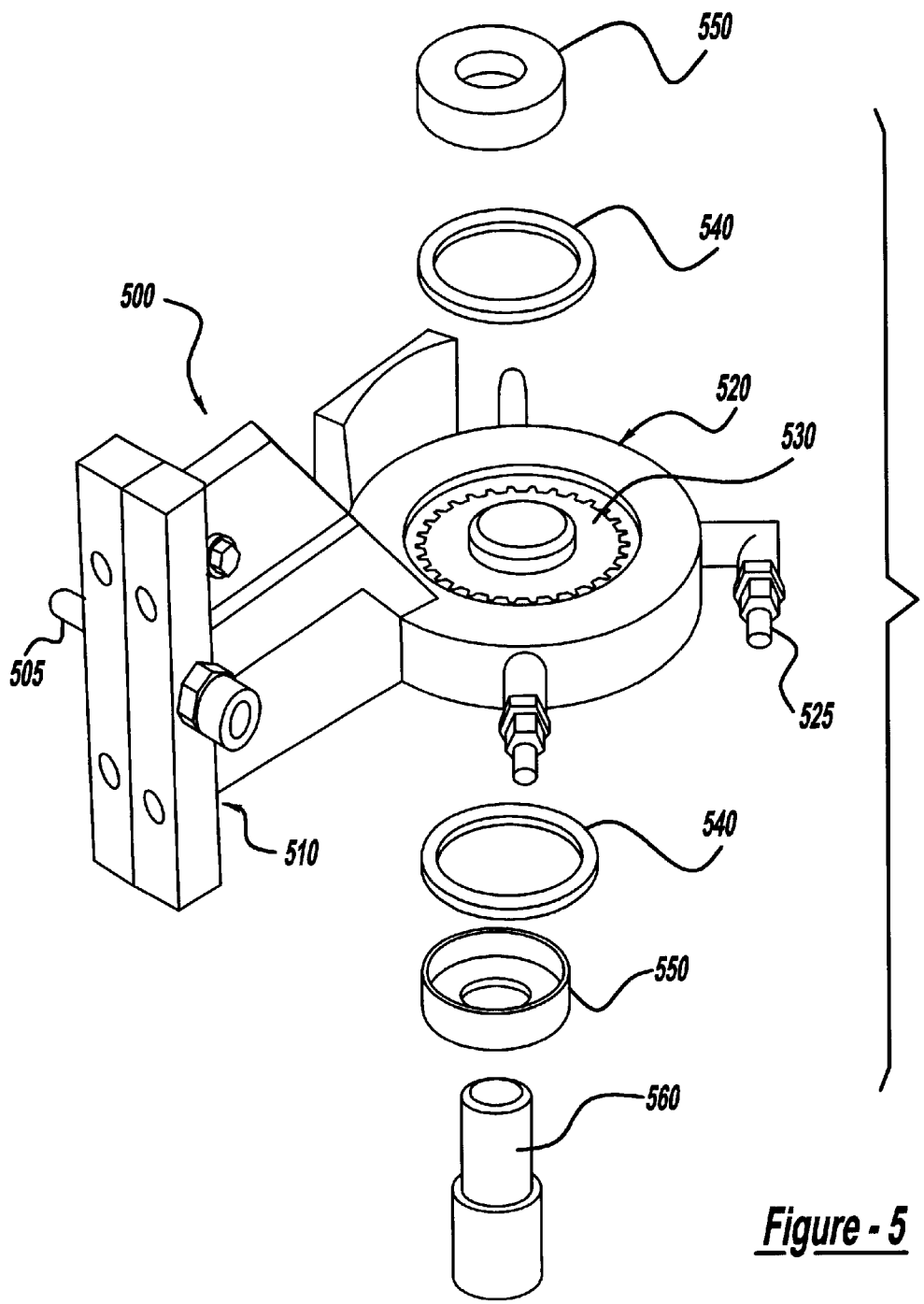
FIG. 5 is an exploded view of an assembly used to carry out a heat treating method of the invention on a gear.
Figure 6:
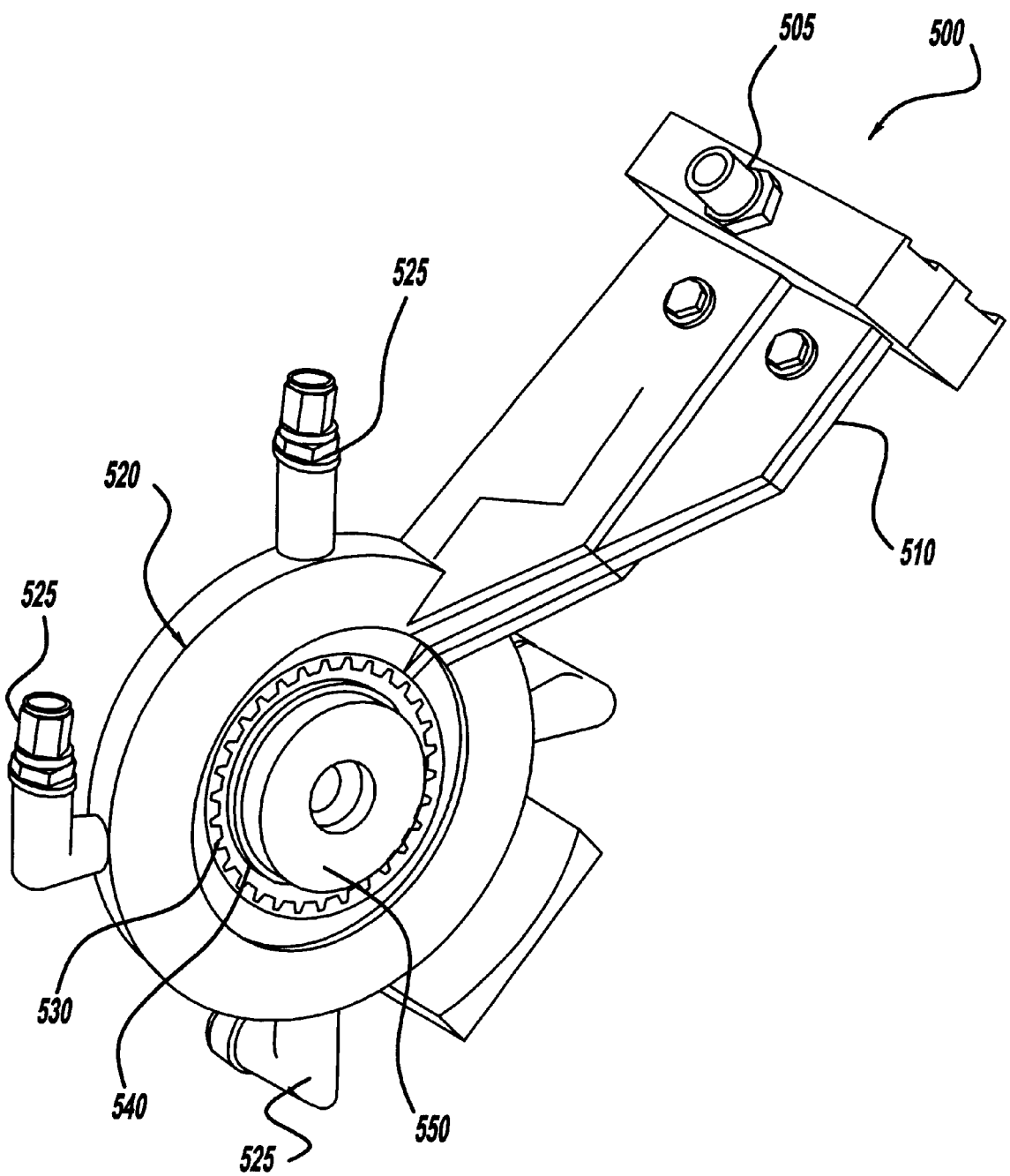
FIG. 6 shows another view of the assembly of FIG. 5.

An exploded view of an apparatus suitable for carrying out the induction heating process of the invention is shown in FIG. 5. An induction assembly 500 consists of a mounting bracket 510 equipped with cooling water inlets 505, a magnetic coil 520, and quench water inlets 525. A workpiece in the form of a gear 530 is disposed inside the coil 520. Conductive shields 540 in the form of an annulus or ring are provided for both faces of the gear 530. The conductive shield 540 is held in place on one side by a disk locator 550 and on the other by a disk locator 550 along with a gear/disk locator 560. FIG. 6 shows the same apparatus as in FIG. 5 but in an assembled state. The gear/disk locator 560 is not shown. In a preferred embodiment, the gear 530 is attached to a spindle, not shown, which spins the gear inside the coil during the induction heating process.

EXAMPLES

Two 40 tooth twelve pitch gears with 0.5 inch (12.7 mm) face width and 3.5 inch outer diameter were manufactured from BMS 7–357 corrosion resistant steel. The gears were heat treated to a predominantly martensitic structure having a Rockwell C hardness of about 37. Both gears were heat treated again using an induction hardening apparatus such as shown in FIG. 6. The objective of the second heat treatment was to develop a hardened case on the working surface of the gear and the gear root.

In a comparative example, a gear was induction heated without the non-conductive magnetic shield of the invention in place. In the example illustrating the process of the invention, the workpiece gear was provided with a non-magnetic conductive shield in the form of an aluminum annulus 0.125 inches thick and 3.05 inches in outer diameter held in physical contact with the gear as shown in FIGS. 5 and 6. The diameter of the shield was about 0.05–0.13 inch less than the diameter of the root region of the gear. In both examples, the gear was spun at 200 rpm. The coil dimensions were 3.678 inch inner diameter and 0.571 inch face width. The magnetic field frequency generated by the coil was about 250 KHz. A preheat was applied for five seconds at about 180 kilowatt magnetic power. This was followed by a 0.55 second dwell. Finally the workpiece was subjected to the magnetic field at a power of about 570 kilowatts for 0.37 seconds. At the end of the final heat, the gear was spray quenched with a water glycol quenchant.

Figure 7A:
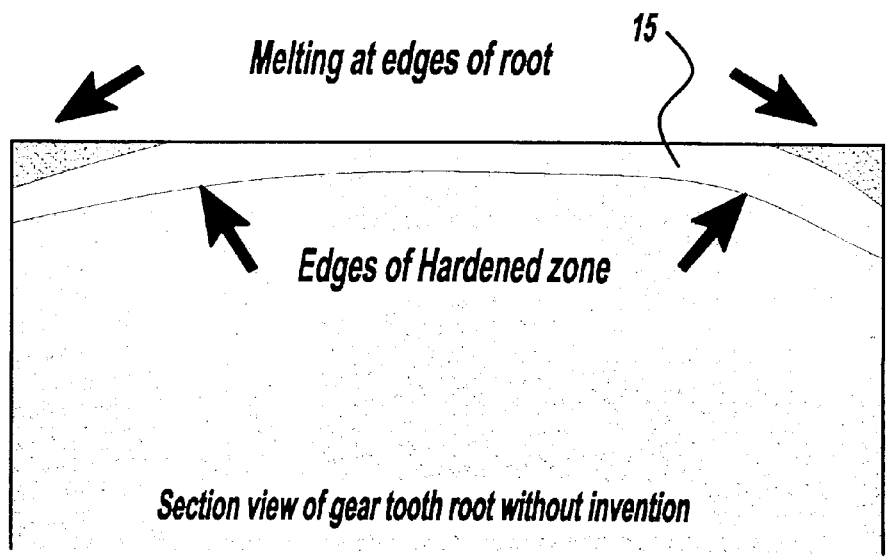
FIGS. 7a) and 7b) are photographs of sections through the center of gear teeth.
Figure 7B:
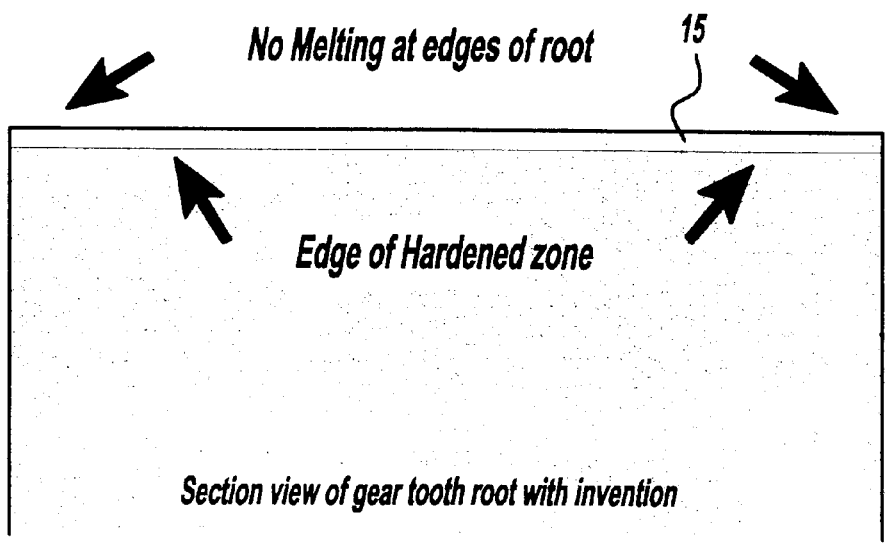

The gears were cross-sectioned to show a length of the root near the center of the root radius. FIGS. 7 and 8 are produced from photographs from metallurgical mounts at about 5X magnification. The hardened areas of the workpiece are shown in the Figures as lighter areas 15. FIG. 7a shows the comparative example where the gear was processed without the non-magnetic conductive shield of the invention. FIG. 7b shows the root of the gear processed with the shield of the invention in place. The alloy for both of the gears is a nitrogen hardening corrosion resistant steel. The alloys are difficult to photograph, as they are resistant to chemical etching used to provide contrast between hardened and unhardened areas. Nevertheless, FIGS. 7a and 7b clearly show how the process of the invention improves the hardening of the gears. FIG. 7a shows melting at the edges of the root in the example where the conductive shield of the invention was not used. On the other hand, FIG. 7b shows that for the example using the conductive shield of the invention, no melting is observed at the edges of the root.

Figure 8A:
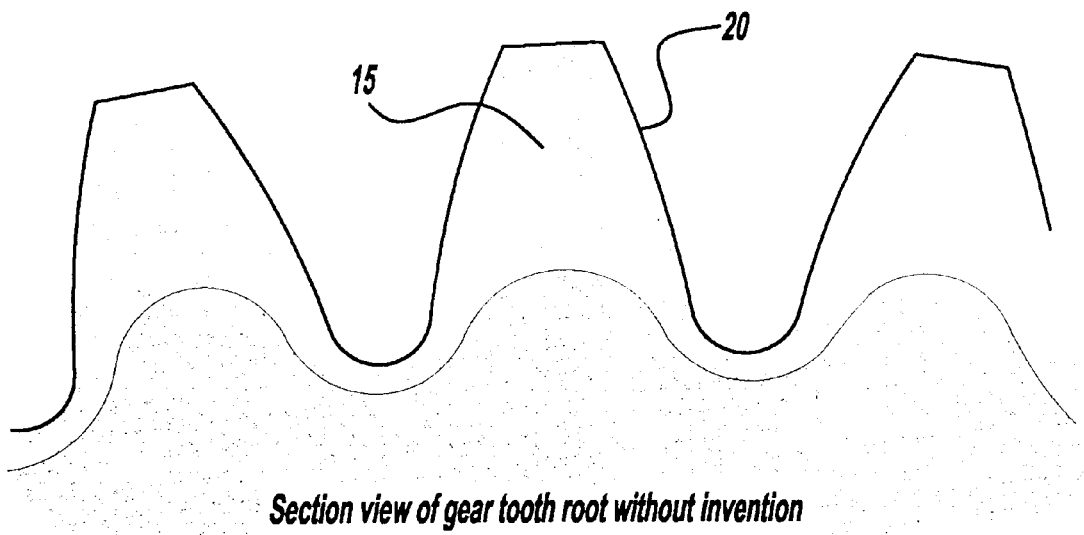
FIGS. 8a and 8b give section views of gear tooth roots.
Figure 8B:
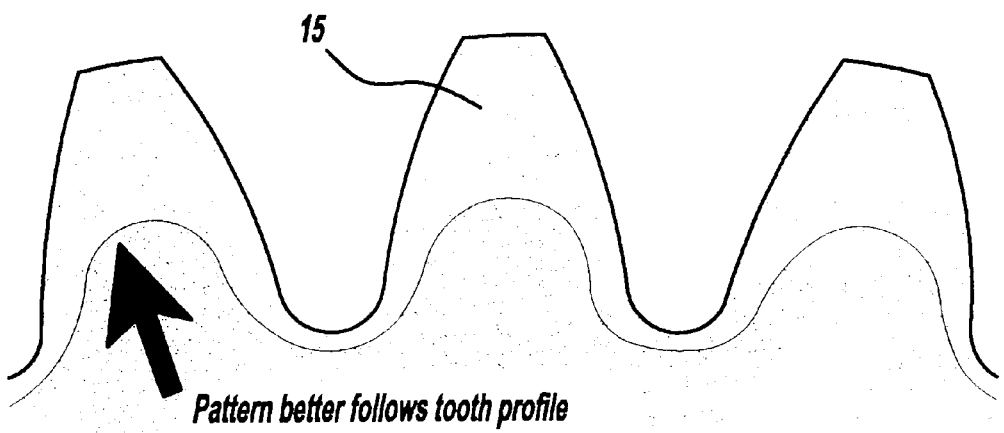

FIG. 8a shows a section through the center of the gear teeth 20 of the gear processed without the conductive shield of the invention in place. Similarly, FIG. 8b shows a section through the center of the gear processed with the conductive shield in place. FIGS. 8a and 8b show that the contour pattern of the hardened area 15 is improved in the gear induction heated with the conductive shield in place.

The invention has been described above with respect to preferred embodiments. The above description however, is non-limiting and variations will be apparent to those of skill in the art. Such variations are intended to be within the scope of the invention as defined in the appended claims.

We claim:

1. A method for heat treating a gear, the gear made of a material characterized by an austenitizing or solution temperature and a fusion or melt temperature, the gear comprising a plurality of gear teeth extending radially from a root region of the gear, the method comprising the steps of:
    placing a non-magnetic conductive shield in proximity to the root region of the gear;
    exposing the gear with the shield in place to a source of time varying magnetic flux, wherein the magnetic flux varies with a frequency sufficient to induce eddy currents in a skin depth of a surface of the gear and wherein the shield is in sufficiently close proximity to at least substantially reduce the eddy currents in the root region of the gear.

2. A method according to claim 1, wherein the conductive shield is in physical contact with the root region of the gear.

3. A method according to claim 1, wherein the conductive shield is placed closer than a skin depth to the root region of the gear.

4. A method according to claim 1, wherein the conductive shield is placed closer than 0.015 inches to the root region of the gear.

5. A method according to claim 1, wherein the surface of the teeth of the gear is heated above the austenitizing or solution temperature, and the root area is heated to a temperature not exceeding the fusion or melt temperature.

6. A method according to claim 1, wherein the fusion or melt temperature is less than 400° F. higher than the austenitizing or solution temperature.

7. A method according to claim 1, wherein the conductive shield is made of a material more highly conductive than the alloy of the gear, and the shield is greater than 3 skin depths thick.

8. A method according to claim 7, wherein the conductive shield is made of a material selected from the group consisting of copper, aluminum, silver, gold, and alloys thereof.

9. A method according to claim 1, wherein the conductive shield covers the root region and extends radially beyond the root region, but not so far as to completely cover the teeth.

10. A method according to claim 1, wherein the gear material comprises corrosion resistant steel.

11. A method for induction heating a workpiece made of an alloy characterized by an austenitizing or solution temperature and a fusion or melt temperature, the workpiece having at least one current concentrating surface, the method comprising the steps of:
    placing a non-magnetic conductive shield in proximity to the current concentrating surface of the workpiece to provide a shielded portion of the workpiece and an unshielded portion of the workpiece;
    exposing the workpiece with the shield in place to a time varying magnetic field having a frequency sufficient to induce eddy currents in a skin depth of a surface of the shield and the workpiece; and
    quenching the workpiece;
    wherein at least part of the unshielded portion of the workpiece is heated above the austenitizing or solution temperature and the covered portion is heated to a temperature below the fusion or melt temperature.

12. A method according to claim 11, wherein the workpiece comprises corrosion resistant steel.

13. A method according to claim 11, wherein the frequency of the time varying magnetic flux is greater or equal to about 3000 Hz.

14. A method according to claim 11, wherein the frequency of the time varying magnetic flux is greater than or equal to about 100 kHz.

15. A method according to claim 11, wherein the conductive shield is in physical contact with the current concentrating surface of the workpiece.

16. A method according to claim 11, wherein the conductive shield is made of a material having greater conductivity than the alloy.

17. A gear made by the process of claim 11.

18. A method for heat treating a gear, the gear comprising a plurality of teeth extending radially from a root region and made of a ferrous alloy characterized by an austenitizing temperature and a fusion temperature less than 400° F. higher than the austenitizing temperature, the method comprising the steps of:
    providing a magnetic coil;
    placing a non-magnetic conductive shield in proximity to the root region of the gear;
    positioning the gear with the conductive shield in place within the magnetic coil;
    exposing the gear to a magnetic field varying at a frequency greater than 3000 Hz; and
    quenching the gear,
    wherein the teeth of the gear are heated to a temperature higher than the austenitizing temperature and the root of the gear is heated to a temperature less than the fusion temperature.

19. A method according to claim 18, wherein the gear is made of corrosion resistant steel.

20. A method according to claim 18, wherein the shield is made of a material with conductivity higher than that of the ferrous alloy.

21. A method according to claim 18, further comprising spinning the gear during exposure to the magnetic field.

* * * * *